United States Patent Office 3,715,363
Patented Feb. 6, 1973

3,715,363
CERTAIN 2-ALIPHATIC-THIOBENZOTHIAZOLES
John D. Diekman, Menlo Park, Calif., assignor to Zoecon Corporation, Palo Alto, Calif.
No Drawing. Filed July 20, 1971, Ser. No. 164,438
Int. Cl. C07d 91/48
U.S. Cl. 260—306   12 Claims

ABSTRACT OF THE DISCLOSURE

Novel 2-aliphatic-thiobenzothiazoles prepared by the alkylation of 2-mercaptobenzothiazole which are useful for the control of insects.

This invention relates to new 2-aliphatic-thiobenzothiazoles and the preparation and use thereof. More particularly, the new 2-aliphatic-thiobenzothiazoles are represented by the following Formula I:

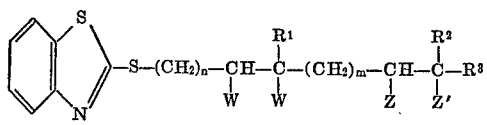
(I)

wherein, each of $R^1$, $R^2$, and $R^3$ is lower alkyl; W is hydrogen or together form a carbon-carbon bond;
Z is hydrogen or together with Z' is a carbon-carbon bond, or oxido;
Z' is hydrogen, lower alkyl, halo, or lower alkoxy when Z is hydrogen;
$m$ is the positive integer one or two; and $n$ is zero, one or two, provided that when $n$ is zero—then W is hydrogen.

The term "lower alkyl," as used herein, refers to an alkyl group, branched or straight, having a chain length of one to six carbon atoms. The term "lower alkoxy," as used herein, refers to an alkoxy group of one to six carbon atoms such as methoxy, ethoxy, i-propoxy, t-butoxy, and the like.

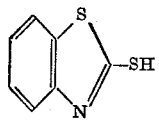
(II)

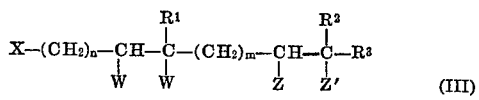
(III)

The compounds of Formula I are prepared by the alkylation of 2-mercaptobenzothiazole (II) using an alkylating agent of Formula III in the presence of base in an organic solvent inert to the reaction under dry conditions. The reaction is conducted under inert atmosphere such as nitrogen or argon. Suitable bases include potassium carbonate, calcium carbonate, sodium hydride, and the like. The organic solvent may be any organic solvent inert to the reaction such as dimethylformamide, tetrahydrofuran, and the like. The reaction is generally carried out at room temperature or above such as the reflux temperature of the reaction mixture. In Formula III, each of $R^1$, $R^2$, $R^3$, W, Z, Z', $m$ and $n$ is as defined above and X is bromo, chloro, iodo, methanesulfonyloxy or tolysulfonyloxy.

Alkylating agents of Formula III are compounds described heretofore which can be purchased commercially or prepared using previously described procedures. See Science 164, 323 (1969) Crossland et al., J. Org. Chem. 35, No. 9, 3195 (1970), U.S. Pats. 3,584,015 and 3,584,-010 and copending applications, Ser. No. 127,803, filed Mar. 24, 1971, Ser. No. 38,503, filed May 18, 1970 and Ser. No. 59,737, filed July 30, 1970 which are incorporated by reference.

2-mercaptobenzothiazole is described by Halasa and Smith, Jr., J. Org. Chem. 36, No. 5, 636 (1971) and the preparation of 2-(lower) alkylthiobenzothiazoles using alkyl halides.

The novel compounds of Formula I are useful for the control of insects. The utility of these compounds as insect control agents is believed to be attributable to their juvenile hormone activity. They are preferably applied to the immature insect—namely during the embryo, larvae or pupae stage in view of their ability to affect metomorphosis and reproduction and otherwise cause abnormal development. These compounds are effective control agents for Hemipteran, such as Lygaeidae, Miridae and Pyrrhocoridae; Dipteran, such as mosquitos; and Homoptera, such as aphids. The compounds can be applied at dosage levels of the order of 1.0 g. to 50 µg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants, emulsifying agents and wetting agents to assist in the application and efficiency of the active ingredient.

The following examples are provided to illustrate the present invention. Temperature is given in degrees centigrade.

EXAMPLE 1

To about 30 ml. of deoxygenated dimethylformamide, under nitrogen and at about 25°, is added 1.67 g. of 2-mercaptobenzothiazole, 3.14 g. of the mesylate of 7-methoxy-3,7-dimethyloctan-1-ol, and 1.5 g. of potassium carbonate. The reaction mixture is heated at 50°, under nitrogen, for about four hours. The mixture is filtered directly onto ice. The aqueous phase is extracted with ether. The ethereal layers are washed with 10% sodium hydroxide, water and brine, dried over calcium sulfate and concentrated to yield crude 2-(7'-methoxy-3',7'-dimethyloctanyl) thiobenzothiazole which is purified by thin layer chromatography.

EXAMPLE 2

To about 40 ml. of deoxygenated dimethylformamide, under nitrogen and at about 25°, is added 1.67 g. of 2-mercaptobenzothiazole, 2.48 g. of the mesylate of 6,7-oxido-3,7-dimethyloctan-ol and 1.5 g. of potassium carbonate. The reaction mixture is heated at 45°, under nitrogen, for about 3 hours and then worked up as described in Example 1 to yield 2-(6',7'-oxido-3',7'-dimethyloctanyl) thiobenzothiazole which is purified by thin layer chromatography.

EXAMPLE 3

The process of Example 1 is repeated with the exception of using as the alkylating agent each of 3,7-dimethyloct-6-enylbromide, 3,7-dimethylocta-2,6-dienyl bromide, 3,7-dimethylnona-2,6-dienyl bromide, 3-methyl-7-ethylnona-2,6-dienylbromide, 2,5-dimethylhex-4-enyl bromide, 3,7-dimethyloctanyl bromide, 2,5-dimethylhexanyl bromide and 3,7,7-trimethyloctanyl bromide to produce 2-(3',7'-dimethyloct-6'-enyl) thiobenzothiazole,
2-(3',7'-dimethylocta-2',6'-dienyl) thiobenzothiazole,
2-(3',7'-dimethylnona-2',6'-dienyl) thiobenzothiazole,
2-(3'-methyl-7'-ethylnona-2',6'-dienyl) thiobenzothiazole, 2-(2',5'-dimethylhex-4'-enyl) thiobenzothiazole,
2-(3',7'-dimethyloctanyl) thiobenzothiazole,
2-(2',5'-dimethylhexanyl) thiobenzothiazole, and
2-(3',7',7'-trimethyloctanyl) thiobenzothiazole, respectively.

EXAMPLE 4

By use of the procedure of Example 2, 2-mercaptobenzothiazole is alkylated using each of 6,7-oxido-3,7-dimethyloct-2-enyl bromide, 6,7-oxido-3,7-dimethylnon-2-enyl bromide, 6,7-oxido-3-methyl-7-ethyl-non-2-enyl bromide, 4,5-oxido-2,5-dimethylhexanyl bromide and 6,7-oxido-3,7-diethylnon-2-enyl bromide to yield 2-(6',7'-oxido-3',7'-dimethyloct-2-enyl) thiobenzothiazole,
2-(6',7'-oxido--3',7'-dimethyloct-2'-enyl) thiobenzothiazole,
2-(6',7'-oxido-3-methyl-7-enylnon-2'-enyl) thiobenzothiazole,
2-(4',5'-oxido-2',5'-dimethylhexanyl) thiobenzothiazole, and
2-(6',7'-oxido-3',7'-diethylnon-2'-enyl) thiobenzothiazole, respectively.

EXAMPLE 5

Following the process of Example 1, each of 2-(7'-ethoxy-3',7'-dimethyloctanyl) thiobenzothiazole,
2-(7'-methoxy-3',7'-dimethyloct-2'-enyl) thiobenzothiazole,
2-(5'-methoxy-2',5'-dimethylhexanyl) thiobenzothiazole,
2-(7'-methoxy-3',7'-diethylnon-2'-enyl) thiobenzothiazole,
2-(7'-methoxy-3'-methyl-7'-ethylnon-2'-enyl) thiobenzothiazole,
2-(7'-methoxy-3',7'-dimethylnon-2'-enyl) thiobenzothiazole,
2-(7'-isopropoxy-3',7'-dimethyloctanyl) thiobenzothiazole, and
2-(7'-t-butoxy-3',7'-dimethyloctanyl) thiobenzothiazole is prepared by the alkylation of 2-mercaptobenzothiazole using each of 7-ethoxy-3,7-dimethyloctanyl methanesulfonate, 7-methoxy-3,7-dimethyloct-2-enyl bromide, 5-methoxy - 2,5 - dimethylhexanyl methanesulfonate, 7 - methoxy-3,7-diethylnon-2-enyl bromide, 7-methoxy-3-methyl-7-ethylnon-2-enyl bromide, 7-methoxy-3,7-dimethylnon-2-enyl bromide, 7-isopropoxy-3,7-dimethyloctanyl methane sulfonate and 7-t-butoxy-3,7-dimethyloctanyl methanesulfonate as the alkylating agent.

EXAMPLE 6

Each of 2-(7'-chloro-3',7'-dimethyloctanyl) thiobenzothiazole, 2-(7'-fluoro-3',7'-dimethyloctanyl) thiobenzothiazole and 2-(7'-bromo-3',7'-dimethyloctanyl) thiobenzothiazole is prepared from 7-chloro-3,7-dimethyloctanyl methanesulfonate, 7-fluoro-3,7-dimethyloctanyl methanesulfonate and 7-bromo-3,7-dimethyloctanyl methanesulfonate and 2-mercaptobenzothiazole using the procedure of Example 2.

A typical procedure for preparing the halo-substituted alkylating agents (Z' is bromo, chloro or fluoro) is as follows: Anhydrous hydrogen chloride is bubbled into 100 ml. of dry carbon tetrachloride at 0° until one equivalent is taken up. Five grams of 3,7-dimethyloct-6-enyl methanesulfonate is added and the resulting mixture allowed to stand for about 48 hours at 0°. The mixture is evaporated under reduced pressure to yield 7-chloro-3,7-dimethyloctanyl methanesulfonate. By using hydrogen fluoride and hydrogen bromide in the foregoing procedure the respective 7-bromo derivatives are obtained.

What is claimed is:

1. A compound selected from those of the following Formula I:

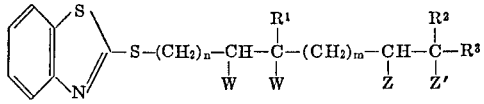

(I)
wherein, each of $R^1$, $R^2$ and $R^3$ is lower alkyl;

W is hydrogen or together form a carbon-carbon bond;

Z is hydrogen or together with Z' is a carbon-carbon bond or oxido;

Z' is hydrogen, lower alkyl, halo, or lower alkoxy, when Z is hydrogen;

$m$ is the positive integer one or two; and $n$ is zero or the positive integer one or two, provided that when $n$ is zero—then W is hydrogen.

2. A compound according to claim 1 wherein $n$ is one; $m$ is two; and each of $R^1$, $R^2$ and $R^3$ is methyl or ethyl.

3. A compound according to claim 2 wherein W is hydrogen; each of $R^1$, $R^2$ and $R^3$ is methyl and Z together with Z' is oxido.

4. A compound according to claim 2 wherein each of W and Z is hydrogen; each of $R^1$, $R^2$ and $R^3$ is methyl; and Z' is lower alkoxy.

5. A compound according to claim 4 wherein Z' is methoxy.

6. A compound according to claim 2 wherein W is hydrogen; each of $R^1$, $R^2$ and $R^3$ is methyl; and Z together with Z' is a carbon-carbon bond.

7. A compound according to claim 2 wherein W and W together form a carbon-carbon bond; Z is hydrogen and Z' is lower alkoxy.

8. A compound according to claim 7 wherein $R^1$ is methyl.

9. A compound according to claim 2 wherein W and W together form a carbon-carbon bond, and Z together with Z' is a carbon-carbon bond or oxido.

10. A compound according to claim 9 wherein $R^1$ is methyl.

11. A compound according to claim 1 wherein $n$ is zero; $m$ is one; Z is hydrogen or together with Z' is a carbon-carbon bond or oxido; and Z' is lower alkoxy, when Z is hydrogen.

12. A compound according to claim 11 wherein each of $R^1$, $R^2$ and $R^3$ is methyl.

References Cited
UNITED STATES PATENTS

| | | | |
|---|---|---|---|
| 2,088,022 | 7/1937 | Williams | 260—306 |
| 2,776,977 | 1/1957 | D'Amico | 260—306 |
| 3,161,495 | 12/1964 | Miller | 260—306 |
| 3,466,322 | 9/1969 | Elam | 260—306 |

ALEX MAZEL, Primary Examiner

R. J. GALLAGHER, Assistant Examiner

U.S. Cl. X.R.

260—456 R; 424—270